US008341816B1

(12) United States Patent
Swinford

(10) Patent No.: US 8,341,816 B1
(45) Date of Patent: Jan. 1, 2013

(54) TOOL FOR DISCONNECTING AN AIR-HOSE COUPLER

(76) Inventor: Eric R. Swinford, Odessa, TX (US)

( * ) Notice: Subject to any disclaimer, the term of this patent is extended or adjusted under 35 U.S.C. 154(b) by 848 days.

(21) Appl. No.: 12/390,559

(22) Filed: Feb. 23, 2009

(51) Int. Cl.
*B23P 19/04* (2006.01)

(52) U.S. Cl. ............................... 29/237; 29/238; 29/278

(58) Field of Classification Search .................... 29/237, 29/238, 243.56, 263, 261, 278
See application file for complete search history.

(56) References Cited

U.S. PATENT DOCUMENTS 1,085,461 A 1/1914 Michaelis
1,403,059 A 1/1922 Quigley
2,373,478 A * 4/1945 Kuhn .............................. 81/302
2,555,591 A 6/1951 Kane
2,714,321 A * 8/1955 Tamplin .......................... 81/423
3,299,496 A * 1/1967 Christensen .................... 29/237
3,357,085 A * 12/1967 Martin ............................ 29/239
3,540,106 A * 11/1970 Goldman ........................ 29/268
3,652,107 A * 3/1972 Tickett .............................. 285/3
3,677,129 A * 7/1972 Lyon ............................... 84/453
3,845,538 A 11/1974 Demler
D247,278 S 2/1978 Dunn
4,318,316 A * 3/1982 Guilliams .................... 81/426.5
4,571,808 A * 2/1986 King ............................... 29/268
4,757,588 A 7/1988 Churchich
5,277,089 A 1/1994 McGushion
5,537,727 A * 7/1996 Mayer ............................ 29/237
5,991,997 A 11/1999 Schley et al.
6,314,629 B1 11/2001 Showalter et al.
6,389,675 B1 5/2002 Tykoski et al.
6,662,690 B1 12/2003 Ploeger
6,941,626 B2 9/2005 Johnson et al.
D520,828 S 5/2006 Steiner

* cited by examiner

*Primary Examiner* — Lee D Wilson
(74) *Attorney, Agent, or Firm* — James E. Walton; J. Oliver Williams

(57) ABSTRACT

A tool for use in disconnecting a quick-connect air-hose coupler has a pair of arms, each arm having a tool end and a handle, the arms being hinged to each other for relative rotation in generally parallel planes, such that selected relative movement of the handles causes opposite relative movement of the tool ends. An incomplete ring is formed on each tool end, the rings being generally coaxial when the rings are adjacent to each other. An insert is configured for insertion into one of the rings, the insert comprising an opening of a selected width. The handles are able to be moved toward each other for causing the rings to move away from each other while the rings engage an air-hose coupler and a hose, so as to cause the insert in one of the rings to abut a movable sleeve of an air-hose coupler while other of the rings abuts an apparatus fixedly engaging the hose, so that when sufficient force is applied to the handles the sleeve is moved relative to a body of the coupler and to the hose for disconnecting the coupler from the hose. The width of the opening of the insert is selected according to the diameter of the hose.

13 Claims, 5 Drawing Sheets

TOOL FOR DISCONNECTING AN AIR-HOSE COUPLER

BACKGROUND

1. Field of the Invention

The present invention relates generally to hand-operated tools and specifically to hand-operated tools for disconnecting air-hose couplers.

2. Description of Related Art

Air hose couplers are used to connect hoses in pneumatic systems, and many couplers are configured to provide for quick connect and quick disconnect from the attached hoses. These couplers are often used with plastic hoses in air-brake systems on large trucks, and the air pressure within these systems is typically between 150 psi and 170 psi. The couplers may have many configurations, including two opposing ends and T-connections, and the couplers are typically formed from brass or nylon.

One type of such a connector is a Quick-Connect Air Brake coupler (Q-CAB), produced by Eaton of Eden Prairie, Minn. FIGS. 1 and 2. are partial cross-sectional views showing the mating portion 11 of a Q-CAB, in which a movable retaining sleeve 13 is slidable relative to an outer body 15 of mating portion 11. Sleeve 13 comprises an outer circular rim 17 and multiple fingers 19 that extend axially into body 15 and away from rim 17. Each finger 19 comprises a barbed end 21 that is configured to retain the end of a hose 23 (shown in phantom) within body 15. Hose 23 is first inserted into body 15 and onto a cylindrical nipple 25. When rim 17 of sleeve 13 is pulled in an axial direction away from body 15 to the position shown in FIG. 2, barbed end 21 of each finger 19 is forced toward nipple 25 by a ramp 27, causing each barbed end 21 to compress the sidewall of hose 21 against nipple 25. The barbs on each barbed end 21 engage the sidewall of hose 23, opposing any forces tending to pull hose 23 from within body 15. When sleeve 13 is moved into the position shown in FIG. 2, a groove 29 is formed between rim 17 and the end of body 15. To disconnect mating portion 11 from hose 23, sleeve 13 is moved back into body 15 to the position shown in FIG. 1.

Several tools for disconnecting quick-connect couplers have been disclosed. These include Quick Release Pliers, available from Mac Tools of Westerville, Ohio, and the tools described in U.S. Pat. No. 6,314,629 to Showalter, Sr. et al. However, several shortcomings remain in the available tools.

DETAILED DESCRIPTION OF THE PREFERRED EMBODIMENT

Figure 2:
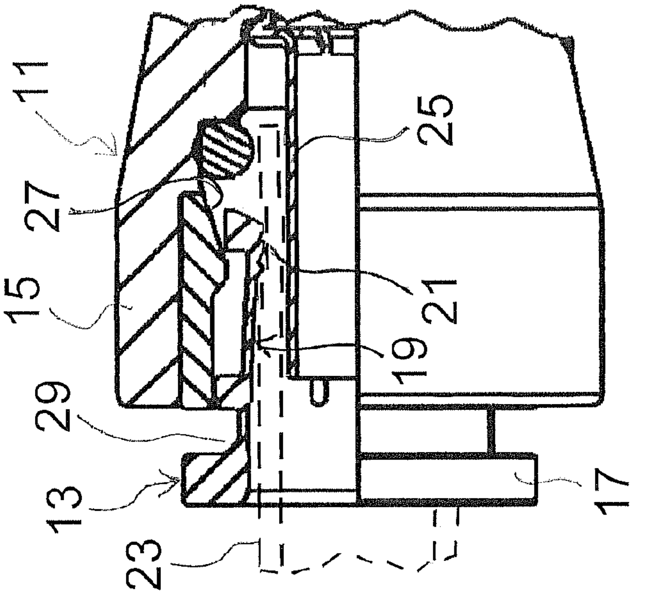
Fig. 2 (prior art)
FIG. 2 is a partial cross-sectional view of the prior art coupler of FIG. 1.
Figure 4:
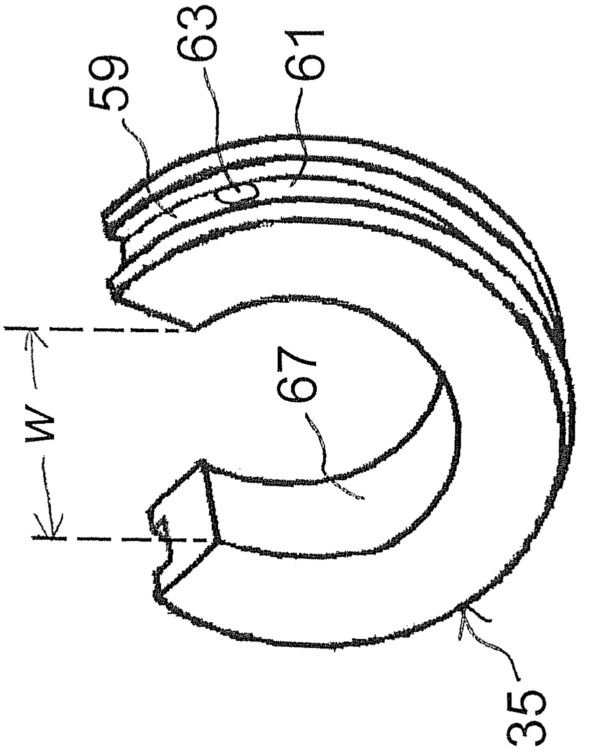
FIG. 4 is an oblique view of an insert for use with the tool of FIG. 3.
Figure 3:
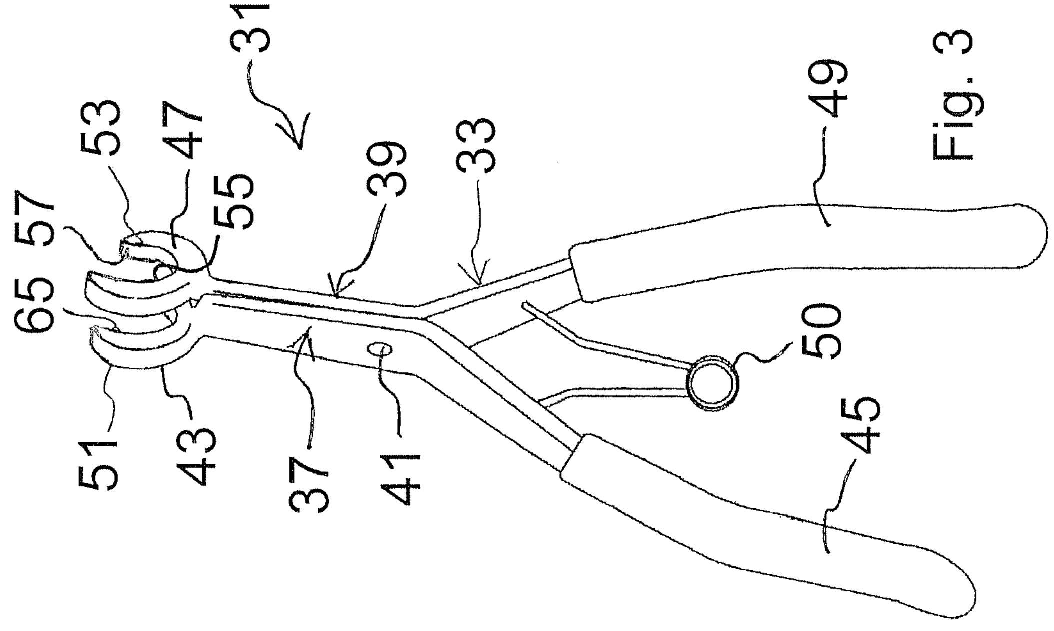
FIG. 3 is an oblique view of a tool for disconnecting an air-hose coupler like the coupler shown in FIG. 1.
Figure 5:
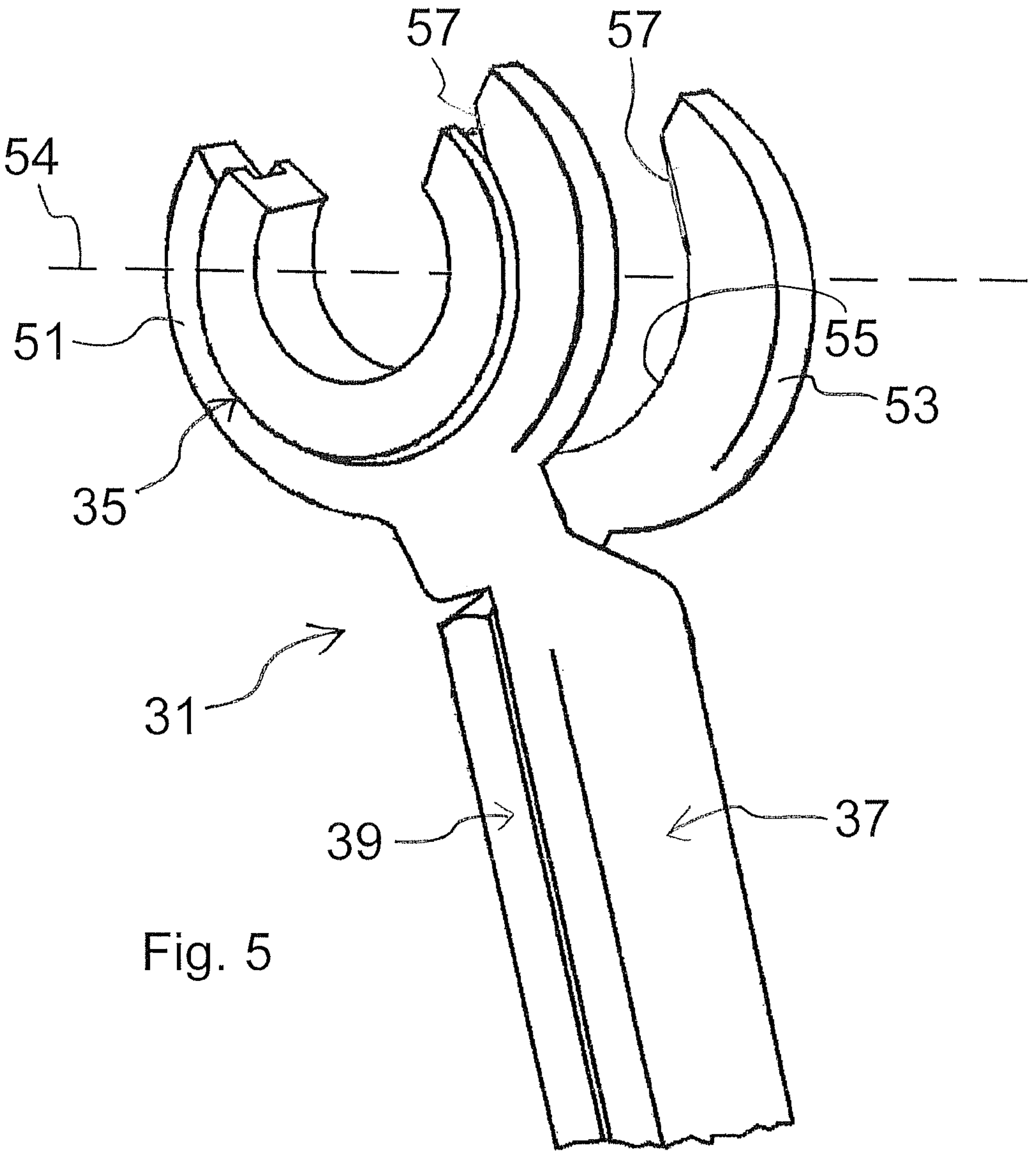
FIG. 5 is an oblique view of the tool of FIG. 3 with an insert installed therein.

Referring to FIGS. 3 through 5 in the drawings, an air-hose release tool 31 according to a preferred embodiment is illustrated. Release tool 31 is configured for use in disconnecting from a hose a quick-connect coupler having a mating portion like mating portion 11, described above. Tool 31 comprises a pliers portion 33 and an insert 35 (shown in FIGS. 2 and 3) selected from different size inserts 35. Insert 35 is removably carried by pliers portion 33.

Pliers portion 33 comprises two arms 37, 39, arms 37, 39, being pivotally connected to each other with a pivot pin 41, allowing for relative rotation of arms 37, 39 in generally parallel planes. Arm 37 has a tool end 43 and an opposing handle 45, and arm 39 also has a tool end 47 and an opposing handle 49. Relative movement of handles 45, 49 produces opposite relative movement between tool ends 43, 47. For example, when handles 45, 49 are moved toward each other, tool ends 43, 47 move away from each other. A spring 50 urges handles 45, 49 apart for biasing arms 37, 39 toward a closed position.

Tool ends 43, 47 each comprise an incomplete ring 51, 53, respectively, and rings 51, 53 are oriented to be generally coaxial along axis 54 when arms 37, 39 are in the closed position. Rings 51, 53 each have an inside surface 55 that terminates in parallel flats 57 that are tangential to a diameter of surface 55. While shown as curved, rings 51, 53 and surface 55 may be formed to have other appropriate shapes.

FIG. 4 shows an insert 35, which is also an incomplete ring formed from metal or a rigid plastic. Insert 35 has an external groove 59 that is sized for receiving the axial thickness of rings 51 as insert 35 is inserted into tool end 43. Groove 59 has an outer surface 61 having a diameter only slightly less than that of inner surface 55 of ring 51, and flats 57 are required for insert 35 to be inserted into ring 51. When installed, outer surface 61 of groove 59 is in contact with surface 55 of ring 51. To retain an insert 35 in ring 51, each insert 35 may have an optional detent recess 63 formed in groove 59 for engaging a detent ball 65 installed in ring 51. Alternatively, other types of optional retention means may be used to retain inserts 35 within ring 51, such as other types of detents or fasteners.

Each insert has an opening width w, as shown in FIG. 4, which corresponds to a width of the hose within the coupler to be disconnected. A set of inserts 35 is preferably provided with tool 31, each insert having a selected width w of ⅛", ¼", ⅜", ½", ⅝", or ¾", and width w is preferably only slightly smaller than the overall diameter of inner surface 67 of insert 35. This allows the hose to be easily inserted into insert 35 through width w, but the sizing ensures that the inner diameter of insert 35 is smaller than a rim on the retaining sleeve of the coupler to be disconnected. In one embodiment, inserts are color-coded, such that inserts having different widths have different colors. FIG. 5 shows insert 35 installed on ring 51 of tool 31.

It should be noted that either or both of rings 51, 53 may be configured to receive an insert 35, though the preferred method of use involves the use of an insert in only one of rings 51, 53. Also, though inserts 35 are shown as having a curved exterior shape, it should be understood that inserts 35 may have any appropriate shape, which will preferably match the internal shape of rings 51, 53.

Figure 1:
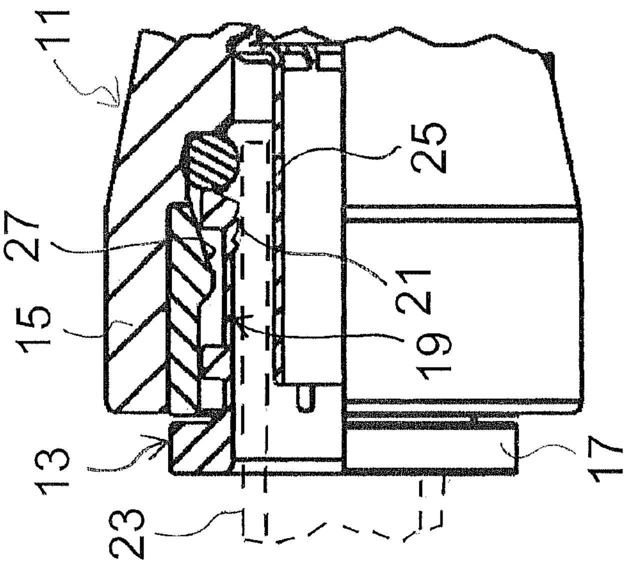
Fig. 1 (prior art)
FIG. 1 is a partial cross-sectional view of a prior art air-hose coupler.
Figure 6:
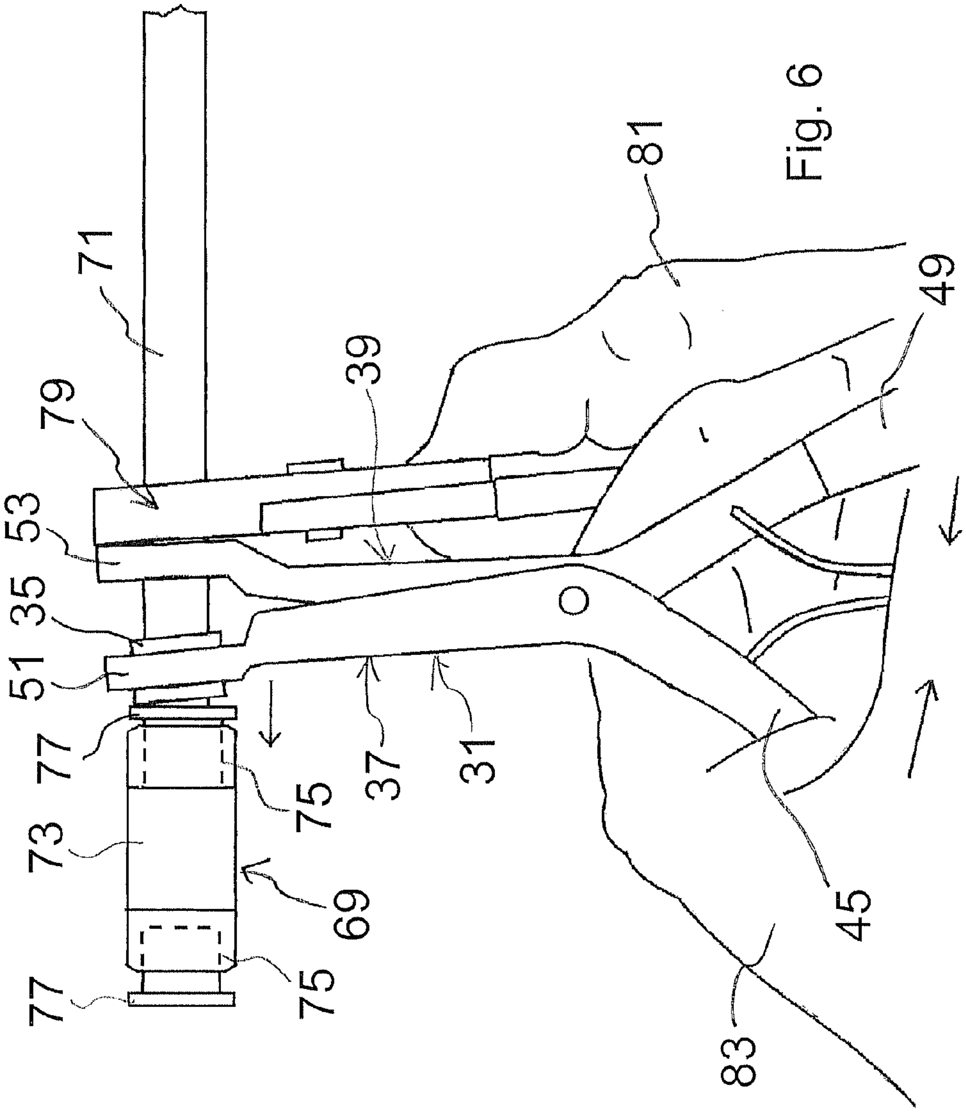
FIG. 6 is a top view of a user using the tool of FIG. 3 to disconnect an air-hose coupler.

FIG. 6 shows tool 31 being used to disconnect a coupler 69 from hose 71. Coupler 69 is configured to have two opposing ends, each capable of coupling to a hose. Each end of coupler 69 comprises a mating portion similar or identical to mating portion 11, described above and shown in FIG. 1. Coupler 69 has a body 73 and retaining sleeves 75 (shown in phantom) in each end, each sleeve 75 having a rim 77. Rim 77 of sleeve 75 on the left end of coupler 69 is shown in the extended position, in which sleeve 75 is in an engaged position for retaining a hose end within body 73.

To release hose 71 from the mating portion on the right end of coupler 69, it is necessary to move sleeve 75 axially inward relative to body 73 and to hose 71. In order to use tool 31 to disconnect coupler 69, a user must select an insert 35 having a width w that is generally equal to (or bigger than) the diameter of hose 71. It is only necessary for an insert 35 to be inserted into one of rings 51, 53, as the other of rings 51, 53 will preferably be used without an insert 35.

In order to produce the force required to move sleeve 75 within body 73, the user operates a pair of ordinary pliers 79 with one hand 81 to firmly grasp hose 71 a short distance from rim 77. The other hand 83 of the user is used to position tool 31 so that hose 71 is located within both rings 51, 53 (and within insert 35 in ring 51) while positioning rings 51, 53 between pliers 79 and rim 77. The user then uses hand 83 to apply force to ends 45, 49 to move ends 45, 49 toward each other, which causes rings 51, 53 to move away from each other. Because pliers 79 are firmly gripping hose 71, pliers 79 oppose any axial motion of ring 53 after contact with pliers 79. When the force applied exceeds the amount required to move sleeve 75 relative to body 73 and to hose 71, ring 51 moves to the left, pushing rim 77 (and sleeve 75) toward body 73. As described above for mating portion 11, moving sleeve 75 allows the fingers of sleeve 75 to move radially outward where they are disengaged from hose 71. It should be noted that it is generally necessary to release the pressure within the pneumatic system to allow for coupler 69 to be disconnected from hose 71.

One advantage to using tool 31 is that one tool can be used to service many sizes of couplers and hoses with only a simple switch of the insert. The use of tool 31 eliminates the need for tools each configured for one size of hose or coupler. In addition, tool 31 lacks the complicated and expensive adjustable components of some prior-art tools.

Figure 7:
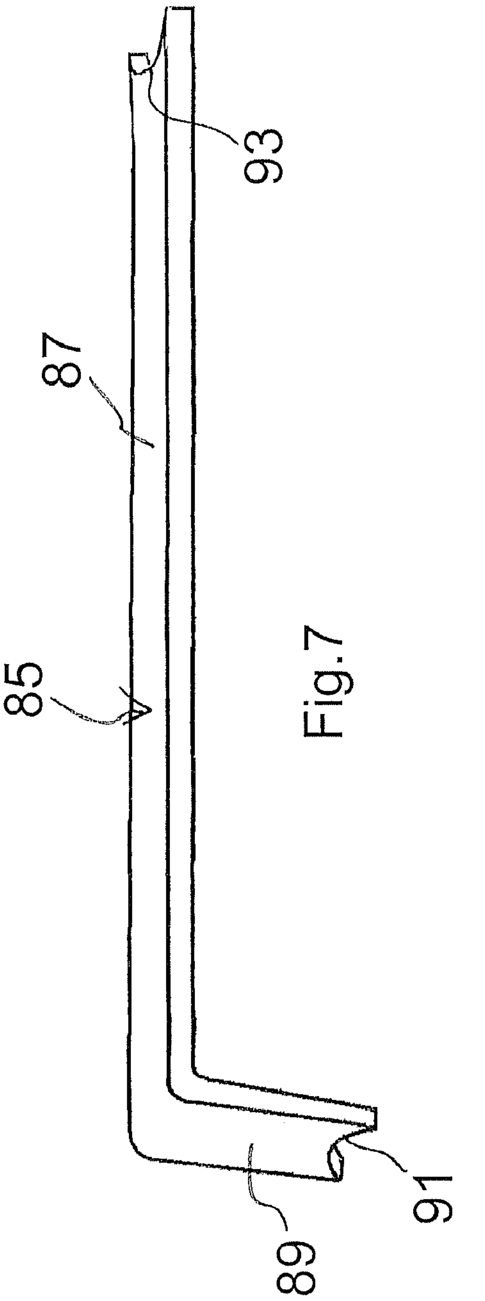
FIG. 7 is an oblique view of a tool for cleaning a groove in an air-hose coupler.
Figure 8:
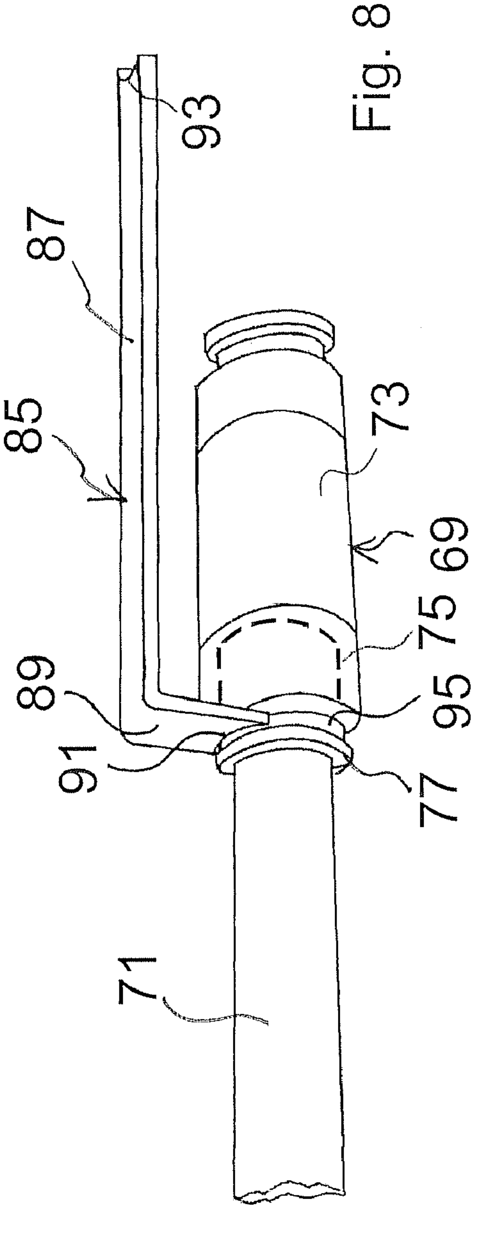
FIG. 8 is an oblique view of the tool of FIG. 7 engaged with a groove of an air-hose coupler.

Referring now to FIGS. 7 and 8, a cleaning tool 85 is shown for cleaning a groove formed between a rim of a sleeve and the body of the coupler. It is often the case that vehicle manufacturers assemble pneumatic system components prior to spray painting the components or an adjacent area on the vehicle. Paint within the groove may prevent the sleeve from moving axially into the body to release the attached hose. In addition, dirt, grease, or other substances can accumulate in groove during use of the vehicle and often must be removed prior to disconnecting a coupler.

Tool 85 is generally L-shaped, with an elongated handle 87 and a generally perpendicular scraper 89 extending from one end of handle 87. The outer end of scraper 89 has a curved scraping edge 91 formed to have a radius corresponding to an inner surface of groove 93 (FIG. 8) between rim 77 and body 73 of coupler 69. In addition, another curved scraping edge 93 is formed at the opposite end of handle 87. The preferred sizes of edges 91, 93 correspond to the couplers for hose sizes including ⅛", ¼", ⅜", ½", ⅝", and ¾". Edges 91, 93 allow for a user to easily clean paint, dirt or other substances from the circumference of groove 95, as shown in FIG. 8.

The tools described above provide several advantages, including: (1) providing a simple and inexpensive tool for use in disconnecting an air-hose coupler; and (2) providing a tool for cleaning the groove between a rim of a retaining sleeve and a body of a coupler.

While this invention has been described with reference to at least one illustrative embodiment, this description is not intended to be construed in a limiting sense. Various modifications and combinations of the illustrative embodiments, as well as other embodiments of the invention, will be apparent to persons skilled in the art upon reference to the description.

I claim:

1. A tool for use in disconnecting a quick-connect air-hose coupler, the tool comprising:

a pair of arms, each arm having a tool end and a handle, the arms hinged between the tool end and the handle, the hinge located inboard of the tool ends, the arms being hinged to each other for relative rotation in generally parallel planes, such that selected relative movement of the handles causes opposite relative movement of the tool ends;

an incomplete ring formed on each tool end, the rings being generally coaxial when the rings are adjacent to each other; and an insert configured for insertion into one of the rings, the insert comprising an opening of a selected width and a groove along an outer surface of the insert, the groove configured to engage the incomplete ring, such that the insert extends along the sides of the incomplete ring;

wherein the handles are adapted to be moved toward each other for causing the rings to move away from each other while the rings engage air-hose coupler and a hose, so as to cause the insert in one of the rings to abut a movable sleeve of an air-hose coupler while other of the rings abuts an apparatus fixedly engaging the hose, so that when sufficient force is applied to the handles the sleeve is moved relative to a body of the coupler and to the hose for disconnecting the coupler from the hose;

wherein the width of the opening of the insert is selected according to the diameter of the hose.

2. The tool according to claim 1, wherein the insert has an outer groove sized for receiving a thickness of one of the rings.

3. The tool according to claim 1, wherein the width of the opening of the insert is selected from the group consisting of ⅛", ¼", ⅜", ½", ⅝", and ¾".

4. The tool according to claim 1, wherein the apparatus fixedly engaging the hose is a pair of pliers.

5. The tool according to claim 1, wherein the insert is formed from a plastic material.

6. The tool according to claim 1, wherein the insert is formed from a metal material.

7. A tool for use in disconnecting a quick-connect air-hose coupler, the tool comprising:

a pair of arms, each arm having a tool end and a handle, the arms hinged between the tool end and the handle, the hinge located inboard of the tool ends, the arms being hinged to each other for relative rotation in generally parallel planes, such that selected relative movement of the handles causes opposite relative movement of the tool ends;

an incomplete ring formed on each tool end, the rings being generally coaxial when the rings are adjacent to each other;

an insert configured for insertion into one of the rings, the insert comprising an opening of a selected width and an outer groove extending internally along an outer surface of the inert, the groove being sized for receiving a thickness of one of the rings and for extending along the sides of the ring; and wherein the handles are adapted to be moved toward each other and cause the rings to move away from each other while the rings engage an air-hose coupler and a hose, so as to cause the insert in one of the rings to abut a movable sleeve of an air-hose coupler while the other of the rings abuts an apparatus fixedly engaging the hose, so that when sufficient force is applied to the handles the sleeve is moved relative to a body and to the hose of the coupler for disconnecting the coupler from the hose;

wherein the width of the opening of the insert is selected according to the diameter of the hose.

8. The tool according to claim 7, wherein the width of the opening of the insert is selected from the group consisting of ⅛", ¼", ⅜", ½", ⅝", and ¾".

9. The tool according to claim 7, wherein the apparatus fixedly engaging the hose is a pair of pliers.

10. The tool according to claim 7, wherein the insert is formed from a plastic material.

11. The tool according to claim 7, wherein the insert is formed from a metal material.

12. A method for disconnecting a quick-connect air-hose coupler from a hose, the method comprising:

(a) providing a pliers-type tool having two rings capable of being separated by actuating the tool, the rings being generally coaxial when adjacent to each other;

(b) inserting an insert around one of the rings, a width of the insert being selected according to a width of a hose on which a coupler is to be disconnected, the insert extending along the sides of the ring;

(c) engaging the hose with the rings and insert, the rings being located along the hose between a rim of a quick-connect coupler and an apparatus fixedly engaging the hose; and (d) actuating the tool to cause the rings to move away from each other contacting the apparatus and the coupler, such that the rim of the coupler is moved relative to a body of the coupler, thereby disconnecting the coupler from the hose.

13. The method according to claim 12, wherein the apparatus fixedly engaging the hose is a pair of pliers.

* * * * *